US012511754B2

(12) United States Patent
Vornehm et al.

(10) Patent No.: US 12,511,754 B2
(45) Date of Patent: Dec. 30, 2025

(54) COMPUTER-IMPLEMENTED METHOD FOR DETERMINING SCAR SEGMENTATION

(71) Applicant: Siemens Healthineers AG, Forchheim (DE)

(72) Inventors: Marc Vornehm, Erlangen (DE); Daniel Giese, Erlangen (DE); Jens Wetzl, Erlangen (DE); Elisabeth Preuhs, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 410 days.

(21) Appl. No.: 18/162,852

(22) Filed: Feb. 1, 2023

(65) Prior Publication Data

US 2023/0252640 A1 Aug. 10, 2023

(30) Foreign Application Priority Data

Feb. 4, 2022 (EP) .................................... 22155242

(51) Int. Cl.
*G06T 7/11* (2017.01)
*A61B 5/055* (2006.01)

(52) U.S. Cl.
CPC ............... *G06T 7/11* (2017.01); *A61B 5/055* (2013.01); *G06T 2207/20084* (2013.01)

(58) Field of Classification Search
CPC ............ G06T 7/11; G06T 2207/20084; G06T 2207/10081; G06T 2207/10088; G06T 2207/10116; G06T 2207/20081; G06T 2207/20104; G06T 2207/30048; A61B 5/055; G06V 10/26; G06V 10/82; G06V 2201/03

See application file for complete search history.

(56) References Cited

U.S. PATENT DOCUMENTS

| 9,311,570 | B2 * | 4/2016 | Mohr ..................... G06T 7/11 |
| 9,968,257 | B1 * | 5/2018 | Burt ..................... A61B 5/0035 |
| 10,600,184 | B2 * | 3/2020 | Golden .................. G06T 7/149 |
| 10,997,716 | B2 | 5/2021 | Zaharchuk et al. |

(Continued)

FOREIGN PATENT DOCUMENTS

| EP | 3576049 A2 * | 12/2019 | ............ G06N 3/08 |
| WO | WO-2010023618 A1 * | 3/2010 | ............ G06T 7/149 |
| WO | WO-2019155306 A1 * | 8/2019 | ....... G06V 30/19173 |

OTHER PUBLICATIONS

Yang, G. "Fully automatic segmentation and objective assessment of atrial scars for long-standing persistent atrial fibrillation patients using late gadolinium-enhanced MRI" Medical Physics, vol. 45, Issue 4, Apr. 2018, pp. 1562-1576 (Year: 2018).*

(Continued)

*Primary Examiner* — Mia M Thomas
(74) *Attorney, Agent, or Firm* — Harness, Dickey & Pierce, P.L.C.

(57) ABSTRACT

A computer-implemented method for determining scar segmentation includes receiving a medical image of an object to be segmented acquired after an application of a low-dose of contrast agent and determining a scar segmentation mask by applying a trained artificial neural network to the medical image. The low-dose of the contrast agent includes less contrast-agent than a standard full-dose of the contrast agent.

18 Claims, 3 Drawing Sheets

(56) References Cited

U.S. PATENT DOCUMENTS

| | | | | |
|---|---|---|---|---|
| 2004/0127799 | A1* | 7/2004 | Sorensen | G06T 7/0012 600/481 |
| 2015/0003706 | A1* | 1/2015 | Eftestol | G06T 7/11 382/131 |
| 2016/0025835 | A1* | 1/2016 | Gulani | G01R 33/5635 600/420 |
| 2018/0218497 | A1* | 8/2018 | Golden | G06T 7/136 |
| 2018/0253844 | A1* | 9/2018 | Forman | A61B 5/055 |
| 2018/0286037 | A1* | 10/2018 | Zaharchuk | G06T 5/60 |
| 2019/0108634 | A1* | 4/2019 | Zaharchuk | G06N 3/08 |
| 2020/0138521 | A1* | 5/2020 | Aben | A61B 5/7425 |
| 2020/0179722 | A1* | 6/2020 | Packer | A61N 5/1037 |
| 2020/0311932 | A1* | 10/2020 | Hooper | G06F 18/2413 |
| 2021/0121715 | A1* | 4/2021 | Falco | G06T 7/0012 |
| 2021/0137384 | A1* | 5/2021 | Robinson | A61B 5/361 |
| 2021/0249142 | A1* | 8/2021 | Lau | G16H 50/50 |
| 2022/0107378 | A1* | 4/2022 | Dey | G01R 33/56 |
| 2022/0208355 | A1* | 6/2022 | Li | G06T 7/174 |
| 2022/0287671 | A1* | 9/2022 | Huang | A61B 6/037 |
| 2022/0334208 | A1* | 10/2022 | Tamir | G06T 5/50 |
| 2023/0033442 | A1* | 2/2023 | Xiang | G06T 3/4053 |
| 2023/0118094 | A1* | 4/2023 | Morgas | G06T 7/0012 382/128 |
| 2023/0394670 | A1* | 12/2023 | Trayanova | G06T 7/12 |
| 2024/0212143 | A1* | 6/2024 | Buckler | G06N 20/00 |
| 2024/0273362 | A1* | 8/2024 | Valbusa | G16H 30/00 |
| 2025/0131562 | A1* | 4/2025 | Golden | G16H 50/20 |
| 2025/0147136 | A1* | 5/2025 | Chitiboi | G06T 7/11 |

OTHER PUBLICATIONS

Fahmy AS. et al.:"Automated cardiac MR scar quantification in hypertrophic cardiomyopathy using deep convolutional neural networks". JACC: Cardiovascular Imaging. 2018; 11:1917-1918. doi: 10.1016/j.jcmg.2018.04.030.

M. Vornehm et al., Myocardial Scar Segmentation on LGE Images with Reduced GBCA-Dose Using Deep Learning; Magnetic resonance, 2021.

Rosendahl Lene et al: "Late gadolinium uptake demonstrated with magnetic resonance in patients where automated PERFIT analysis of myocardial SPECT suggests irreversible perfusion defect"; BMC Medical Imaging; Biomed Central; London; vol. 8; No. 1; pp. 17; 2008.

SubtleGAD™, AI-powered for safer MRI; https://subtlemedical.com/subtlegad/.

Gong et al., "Deep Learning Enables Reduced Gadolinium Dose for Contrast-Enhanced Brain MRI", Journal of Magnetic Resonance Imaging, International Society for Magnetic Resonance in Medicine, 2018, pp. 1-11 .; 2018.

Ronneberger, Olaf et al. "U-Net: Convolutional Networks for Biomedical Image Segmentation" Medical Image Computing and Computer-Assisted Intervention (MICCAI), Springer, LNCS, vol. 9351, pp. 234-241, 2015 // arXiv:1505.04597 [cs.CV].

Moccia S. et al.:"Development and testing of a deep learning-based strategy for scar segmentation on CMR-LGE images". Magnetic Resonance Materials in Physics, Biology and Medicine. 2019; 32:187-195. doi: 10.1007/s10334-018-0718-4.

Yinzhe Wu et al: "Recent Advances in Fibrosis and Scar Segmentation from Cardiac MRI: A State-of-the-Art Review and Future Perspectives"; arxiv.org; Cornell University Library Ithaca, NY 14853; 2021.

Xu Chenchu et al: "Direct Detection of Pixel-Level Myocardial Infarction Areas via a Deep-Learning Algorithm"; SAT 2015 18th International Conference; Austin, TX, USA; Sep. 24-27, 2015; [Lecture Notes in Computer Science; Lect.Notes Computer]; Springer; Berlin, Heidelberg; pp. 240-249; 2017.

Segars, W. P. et al., "4D XCAT phantom for multimodality imaging research," Med Phys. Sep. 2010; 37(9):4902-4915; 2010.

Galea Nicola et al: "Ultra low-dose of gadobenate dimeglumine for late gadolinium enhancement (LGE) imaging in acute myocardial infarction: A feasibility study"; European Journal of Radiology; Elsevier Science; vol. 83, No. 12; pp. 2151-2158; 2014.

* cited by examiner

COMPUTER-IMPLEMENTED METHOD FOR DETERMINING SCAR SEGMENTATION

CROSS-REFERENCE TO RELATED APPLICATION(S)

The present application claims priority under 35 U.S.C. § 119 to European Patent Application No. 22155242.5, filed Feb. 4, 2022, the entire contents of which are incorporated herein by reference.

FIELD

One or more example embodiments relates to a method for training an artificial neural network for determining scar segmentation, such as for a myocardial scar, a computer-implemented method for determining scar segmentation, an imaging method for determining a scar area, as well as a corresponding computer program, a non-transitory computer-readable medium, and a system.

RELATED ART

According to the state of the art, contrast agents are used in medical imaging, in particular in magnetic resonance imaging (MRI), in order to accentuate different areas or types of tissue in a medical image of a subject or object. Thus, for example, structures and functions may be traced more easily and/or efficiently. For example, MRI with late gadolinium enhancement (LGE) is used for patients with acute and chronic myocardial infarction in order to indicate scarred myocardium. Typically, for this purpose, gadolinium-based contrast agents (GBCA) are injected before image acquisition. LGE imaging is currently performed with standard doses, which are quite high, wherein the exact dose depends on the choice of the agent and other factors. For accurate quantification of the scar extent, the enhanced region is then segmented using one of several established methods. In many cases, assessment of the extent of LGE in these patients is used as a key biomarker for treatment and prognosis.

In order to automatize the process of scar segmentation, to save time and to achieve a more objective way of data evaluation it has been proposed to utilize a deep convolutional neural network to automatically quantify the scar volume on magnetic resonance images acquired with LGE. In particular, this has been proposed by Fahmy et al. in "Automated cardiac MR scar quantification in hypertrophic cardiomyopathy using deep convolutional neural networks", JACC: Cardiovascular Imaging, 2018; 11:1917-1918. doi: 10.1016/j.jcmg.2018.04.030 and by Moccia et al. in "Development and testing of a deep learning-based strategy for scar segmentation on CMR-LGE images", Magnetic Resonance Materials in Physics, Biology and Medicine, 2019; 32:187-195, doi: 10.1007/s10334-018-0718-4.

For a long time, it was assumed that the application of GBCA does not pose any danger to a patient and the contrast agent will be completely removed from a patient's body quite soon after its application. However, recently it has been found that, after an application of a contrast agent, increased signal values were detected via MRI suggesting the presence of traces of gadolinium in brain regions some considerable time, e.g. months, after the application of the contrast agents. Accordingly, concerns about the safety of GBCA have led to an interest in reducing the amounts of administered GBCA. However, for the purpose of scar segmentation, simply reducing the GBCA dose would lead to inaccurate and unreliable assessment of the scar.

In U.S. Pat. No. 10,997,716 B2, a method for diagnostic imaging has been proposed using a deep learning network. Therein a zero-contrast and a low-contrast agent image are used as input to predict a synthesized full-dose contrast agent image via the deep learning network. However, the document does not seem to be concerned with scar segmentation. Furthermore, the acquisition of two different images, namely the low-contrast agent image and the zero-contrast agent image, are needed for this method.

SUMMARY

One or more example embodiments provides a method for carrying out scar segmentation that allows using a reduced amount of contrast agent during imaging while still maintaining an accurate and reliable assessment of the scar.

This is met or exceeded by a method according to claim 1, a method according to claim 10, a method according to claim 12, a computer program according to claim 13, a non-transitory computer-readable medium according to claim 14, and a system according to claim 15.

According to one or more example embodiments, a method for training an artificial neural network for determining scar segmentation on contrast agent enhanced medical images with a reduced contrast agent dose includes receiving input training data, the input training data including a first set of medical images of objects to be segmented acquired after an application of a low-dose of the contrast agent, the low-dose of the contrast agent including less of the contrast agent than a full-dose of the contrast agent; receiving output training data, the output training data including reference scar segmentation masks determined from a second set of medical images of the objects acquired after an application of the full-dose of the contrast agent; and training the artificial neural network using the input training data and the output training data to determine the scar segmentation on the contrast agent enhanced medical images with the reduced contrast agent dose.

According to one or more example embodiments, the method further includes determining the reference scar segmentation masks via a full width at half maximum method on the second set of medical images.

According to one or more example embodiments, at least one of the input training data or the output training data comprise real medical images and simulated medical images.

According to one or more example embodiments, the method further includes performing an image registration of the first set of medical images and the second set of medical images to transform the first set of medical images and the second set of medical images into a common coordinate system.

According to one or more example embodiments, the method further includes acquiring each image of the first set of medical images after the low-dose of the contrast agent has been applied; and acquiring each of the second set of medical images after an additional dose of the contrast agent has been applied such that the low-dose and the additional dose equal the full-dose.

According to one or more example embodiments, a computer-implemented method for determining scar segmentation includes receiving a medical image of an object to be segmented acquired after an application of a low-dose of a contrast agent, the low-dose of the contrast agent including less of the contrast agent than a full-dose of the contrast agent; and determining a scar segmentation mask by applying a trained artificial neural network to the medical image.

According to one or more example embodiments, the trained artificial neural network is trained for scar segmentation on contrast agent enhanced medical images with a reduced contrast agent dose.

According to one or more example embodiments, the contrast agent is a gadolinium-based contrast agent, and the medical image is acquired via MR imaging with late gadolinium enhancement.

According to one or more example embodiments, the low-dose comprises 20% to 90% of an amount of the contrast agent of the full-dose.

According to one or more example embodiments, a U-Net based artificial neural network is used.

According to one or more example embodiments, the method further includes determining borders of the object to be segmented on the medical image prior to the determining the scar segmentation mask, wherein the determining the scar segmentation by the artificial neural network is restricted to the determined borders.

According to one or more example embodiments, an imaging method for determining a scar area of an object includes acquiring a medical image of the object after a low-dose of a contrast agent has been applied to the object, the low-dose of contrast agent includes less of the contrast agent than a full-dose of the contrast agent; and determining a scar segmentation mask by applying a trained artificial neural network to the medical image, the trained artificial neural network being trained according to the method of claim 1.

According to one or more example embodiments, a non-transitory computer-readable medium includes instructions which, when executed by a processing unit of a medical imaging device, cause the medical imaging device to perform a method according to one or more example embodiments.

According to one or more example embodiments, a system for determining a scar area of an object includes a first interface configured to receive a medical image of an object to be segmented acquired after an application of a low-dose of a contrast agent, the low-dose of the contrast agent including less of the contrast agent than a full-dose of the contrast agent; a processing unit configured to determine a scar segmentation mask by applying a trained artificial neural network, the trained artificial neural network being trained according to a method according to one or more example embodiments; and a second interface configured to output the scar segmentation mask.

According to one or more example embodiments, the scar segmentation is a segmentation of a myocardial scar.

According to one or more example embodiments, a number of real medical images is increased by at least one of oversampling or augmentation.

According to one or more example embodiments, the method further includes the low-dose comprises 50% to 75% of the amount of the contrast agent of the full-dose.

According to one or more example embodiments, the method further includes the low-dose comprises 60% to 70% of the amount of the contrast agent of the full-dose.

BRIEF DESCRIPTION OF THE DRAWINGS

The accompanying drawings illustrate various example methods and other example embodiments of the invention.

Similar elements are designated with the same reference signs in the drawings.

DETAILED DESCRIPTION

According to one or more example embodiments of the present invention a method for training an artificial neural network for determining scar segmentation, in particular segmentation of a myocardial scar, on contrast agent enhanced medical images with reduced contrast agent dose is proposed. The method comprises:
(a) Receiving input training data, namely a first set of medical images of objects to be segmented acquired after an application of a low-dose of contrast agent, wherein the low-dose of contrast agent comprises less contrast agent than a standard full-dose of contrast agent;
(b) Receiving output training data, namely reference scar segmentation masks as determined from a second set of medical images of said objects acquired after an application of a full-dose of contrast agent;
(c) Training the artificial neural network by using the input training data and the output training data to determine the scar segmentation on the contrast agent enhanced medical images with reduced contrast agent dose.

The artificial neural network may be a convolutional, in particular fully convolutional, neural network. The neural network may comprise multiple layers. Training the neural network may comprise feeding the input training data into the neural network and comparing the output of the neural network with the output training data. During training, based on the comparison, weights of the neural network may be adjusted trying to achieve a closer match between the output of the neural network and the provided output training data. The neural network may be trained thus to determine scar segmentation on images with reduced contrast agent in a way or similarly to a way that the scar would be segmented on standard full-dose images using a standard segmentation method. In this context, similarly may mean that, during training, the weights of the neural network are adjusted such that the output of the neural network approaches the full-dose output training data as closely as possible. The training may be done by a back-propagation algorithm.

The medical images of the input training data, namely the medical images of the first set, as well as the medical images on which the output training data is based, i.e. the medical images of the second set, are in particular contrast agent enhanced. Due to the contrast agent, in particular the visibility of scar tissue on the medical images is enhanced. The first set of medical images and the second set of medical images may be a set of two-dimensional (2D) images, for example represented by a 2D-matrix of grayscale values. Alternatively, the first and second set of medical images may each be a set of three-dimensional (3D) images. The individual medical images of the first set and/or of the second set may be taken from different subjects, in particular patients, but from the same or corresponding part, organ and/or area of the different subjects. It has turned out that data from 10 to 30 patients may be sufficient to apply the inventive method and get satisfying results. Preferably, for each medical image of the first set there is a corresponding medical image of the second set from the same subject and object. Thus, there may be pairs of medical images taken from the same subject and object. The medical images of each pair may be measured one after the other, in particular under the same or similar circumstances apart from the amount of contrast agent administered. The pairs may be used together to train the artificial neural network, i.e., during training, the output of the neural network corresponding to the input of the first of the pair of medical images may be compared to the second of the pair of medical images. The images of the first and second set are preferably registered with each other and/or have the same dimensions, i.e. pixel size, such as 256×256 pixel for a 2D image.

The medical images may be magnetic resonance (MR) images and the contrast agent may be an MR contrast agent. The medical images may be reconstructed from MR data, in particular as magnitude inversion recovery (MagIR) and/or phase-sensitive inversion recovery (PSIR images). The MR data may in principle be obtained by any MR imaging sequence, for example by a gradient echo, spin-echo or fast spin-echo sequence, wherein inversion recovery are preferred, because of the strong T1-weighting. The object may be part of a human or animal patient, in particular comprising scar tissue, such as an organ, part of an organ or an area comprising the organ. For example, the medical images may comprise the heart or part of the heart, in particular the myocardium. Accordingly, the scar or scars to be segmented may be myocardial scar tissue, for example scar tissue resulting from infarction. The scar segmentation mask may be data and/or an image denoting the area of scar tissue on a medical image and/or within an area of the medical image. The output training data, namely the reference scar segmentation masks, may be determined by a state-of-the-art scar segmentation method. The determining of the reference scar segmentation masks does not have to be part of the inventive method, e.g. existing data may be used for this method. However, optionally, determining the reference scar segmentation mask on the second set of medical images may be an additional step of the method applied prior to the step of receiving output training data.

The amount of contrast agent of the full-dose may for example depend on the type of contrast agent that is used, the object to be observed/segmented and/or the individual patient, e.g. the patient's size and/or weight. In this context the standard full-dose of contrast agent may in particular be determined by the manufacturer's recommendation and/or the amount that is usually administered for a specific examination. Correspondingly, the low-dose of contrast agent is lower than the standard full-dose, in particular lower than the manufacturer's recommendation and/or lower than the amount that is usually administered for the specific examination. The standard full-dose may correspond to 0.10 to 0.20 mmol/kg of Gadolinium (Gd)-based contrast agent (GBCA), preferably 0.12 to 1.15 mmol/kg, where kg refers to the patient weight, and the dose in mmol refers to the GBCA, wherein usually each Gd atom is included in a ligand.

The inventive method may be carried out on a processing unit,
such as a GPU (graphics processing unit), CPU (central processing unit) or other digital data processing equipment. Preferably, the method may be executed by a processing unit which is part of or connected to a corresponding imaging system, e.g. an MRI system, used in diagnostic imaging.

Advantageously, one or more example embodiments of the present invention may allow to provide a medical imaging and evaluation system which can quantify the scar extent on medical images, wherein reduced amounts of contrast agent have been applied. I.e., after training the artificial neural network according to the inventive method, only a low-dose medical image, which would otherwise not be sufficient to produce reliable results, is required for scar segmentation. Hence, patient safety may be increased and material costs may be saved since less contrast agent needs to be administered.

According to an embodiment, the contrast agent is a gadolinium-based contrast agent (GBCA), wherein the medical images are in particular acquired via magnetic resonance (MR) imaging with late gadolinium enhancement (LGE). GBCA may typically decrease the T1 relaxation time in MR imaging. Hence, areas where the GBCA accumulates may appear brighter in T1-weighted sequences, such as T1 weighted inversion recovery sequences. Advantageously, GBCA may typically accumulate in scar regions and be present in these regions for a longer time than in the area around the scar tissue. Accordingly late gadolinium enhancement, wherein the measurement is taken a certain time after the administering of GBCA may enhance the scar tissue area in the medical image. LGE is in particular beneficial for a segmentation of myocardial scars. Therein, assessment of the extent of LGE in these patients may be key biomarker for treatment and prognosis. It has turned out that the inventive method works well with LGE on myocardial scars. Hence, the inventive method using LGE may be applied to examine patients with chronic myocardial infarction. The GBCA may be injected about 2 to 20 minutes, preferably 3 to 5 minutes, before imaging. It has turned out that the method may work particularly well, when imaging is carried out 3 to 5 minutes after the administering of the GBCA. The acquired data may for example be reconstructed as magnitude inversion recovery (MagIR) and/or phase-sensitive inversion recovery (PSRI).

According to an embodiment, the reference scar segmentation masks are determined via a full width at half maximum (FWHM) method on the second set of medical images. For this, a reference area may be chosen in the medical image, automatically or, preferably, manually. The reference area may be an area of the enhanced scar tissue area, in particular an area where the scar tissue is clearly recognizable, an area that represents the contrast of the scar tissue area particularly well and/or an area without significant imaging artifacts. On the image, preferably within the reference area, the maximum signal, e.g. per pixel or per average of a cluster of several adjacent pixels, is preferably taken as reference. Advantageously, using the reference area to determine the maximum signal may lead to more robust results and may in particular avoid choosing a faulty, in particular too high, reference value, e.g. due to image artifacts and/or unprecise myocardial segmentation. Further, all pixels in the medical image and/or in an area of the medical image, that have a value higher than a fraction of, in particular half, the reference value, are considered to be scar tissue and are segmented. Hence, a scar segmentation mask is an image having one value (e.g. 1) at the pixels considered to be scar tissue and another value (e.g. 0) at all other pixels. Thus, it may be termed a binary image. It may have the same dimensions as the corresponding image from the second set. Thus, it preferably is also registered with and/or has the same dimensions as the corresponding image from the first set of medical images. The FWHM method may be carried out manually, automatically or partially automatically. For example, some steps, such as choosing the reference area and/or choosing a general area within the medical image where the FWMH for scar segmentation may be applied, may be carried out manually, while some other steps, e.g. determining the maximum signal within the reference area and/or searching for pixels that have a value higher than a fraction of the reference value, i.e. that are considered scar tissue, may be carried out automatically. A reference scar segmentation mask created by the FWHM method has turned out to be a particularly good basis for training the artificial neural network. However, other methods may be applied as well to determine the reference scar segmentation mask. For example, the scar segmentation of the second set of medical images may be carried out completely manually based on the visual impression of an expert of the medical image and/or based on taking a reference standard deviation within the reference area and determining scar tissue by assuming a multiple of the reference standard deviation.

According to an embodiment, the low-dose comprises 20% to 90%, preferably 50% to 75%, more preferably 60% to 70% of the amount of contrast agent of the full-dose. A dose of 50% to 75% may provide a significant reduction of applied contrast agent, while at the same time the reliability of scar segmentation of the thus trained neural network may be in about the same order of magnitude as in the case of a scar segmentation according to the state of the art for a full-dose medical image. In particular, for 60% to 70% of the amount of contrast agent of the full-dose, a Dice score of up to 0.776 could be achieved, wherein the Dice score (also called Sorensen-Dice coefficient) is a statistic used to gauge the similarity of two samples—in this case the segmentation masks obtained from full-dose and from low-dose medical images, respectively.

According to an embodiment, as part of the input training data, borders and/or contours of the objects to be segmented, in particular myocardial borders, are provided on the first set of medical images, wherein the determination of the scar segmentation by the artificial neural network is restricted to said borders. The borders may in particular be provided manually, e.g. by an experienced reader/clinician. Advantageously, the quality of the scar segmentation of the reduced contrast agent medical images via the trained neural network may be increased noticeable by applying this step, in particular by also applying this step correspondingly when using the trained neural network for scar segmentation.

According to an embodiment, a U-Net based artificial neural network, in particular with Batch Normalization and one or several ReLU activation functions is used. Advantageously, the Batch Normalization may stabilize the training. A loss function, preferably a Dice loss function, may be used. The Dice loss function may be used for the training, namely for comparing the output of the artificial neural network with the output training data. Alternatively, another loss function may be applied, such as based on a cross entropy loss. The U-Net may be optimized using an Adam optimizer. However, alternatively, another optimization algorithm, preferably based on gradient descent, may be used as well. For example, a learning rate of 10-4 has worked well. The artificial neural network may comprise copying operations, wherein states may be copied from earlier layers to later layers and then concatenated, thereby skipping layers in between. According to a preferred embodiment, the U-Net may comprise four levels and/or three pooling operations. It has turned out that this configuration may be efficient for the purpose of training and utilizing the neural network for scar segmentation with reduced contrast agent. The U-net may be based on the teachings in the publication of Ronneberger et al. in "U-Net: Convolutional networks for biomedical image segmentation", Medical image computing and computer-assisted intervention—MICCAI 2015. 2015; doi: 10.1007/978-3-319-24574-4_28.

According to an embodiment, the input training data and/or the output training data comprise real medical images and simulated medical images. The simulated medical images may for example be created by an imaging physics simulator, in particular an MR physics simulator. In the case of simulated MR medical images, a virtual phantom, such as the XCAT virtual phantom as described by Segars et al. in "4D XCAT phantom for multimodality imaging research", Medical Physics, 2010; 37:4902-4915. doi: 10.1118/1.3480985, may be used. The simulated medical images may allow to efficiently train the neural network, even if only a small number of real medical images is available. The simulated images may be created with varying amounts and/or types of low-dose contrast agent, e.g. to train the neural network to be more flexible with respect to the amount and/or type of contrast agent. Additionally and/or alternatively, the number of real medical images may be increased by oversampling and/or augmentation comprising horizontal flipping, vertical flipping, rotation, translation, scaling, and/or blurring. Thereby, a real image may be modified to create another "real" image to be used for training. This augmentation may help to train the neural network to be more robust and reliable with respect to varying imaging conditions and/or parameters. Via oversampling and/or augmentation the number of real images may be increased such that they appear equally or about equally often as simulated images. For example, the weighting or impact of the real medical images on the training may thus be greater than that of the simulated medical images.

According to an embodiment, the method comprises the additional step of performing an image registration of the first set of medical images and the second set of medical images in order to transform them into a common coordinate system. An image registration may for example improve the comparing of output training data to the output of the neural network during training. The image registration may be performed based on the borders of the objects to be segmented as described above. Advantageously the method including the image registration may thus be more reliable and/or more focused on the purpose of scar segmentation.

According to an embodiment the method comprises the additional steps of:
  acquiring each image of the first set of medical images after the low-dose of contrast agent has been applied;
  acquiring each of the second set of medical images after an additional dose of contrast agent has been applied such that the low-dose and the additional dose add up to the full-dose, respectively.

These steps are in particular carried out prior to the steps (steps (a), (b), (c)) as described above. For example, a low-dose medical image may be acquired after the application of a first dose of contrast agent, e.g. GBCA, corresponding to the low-dose. The medical image may, for example, be acquired 3-5 minutes after the injection of the contrast agent. Afterwards, the additional dose of contrast agent may be applied to accumulate a full dose of contrast agent. For example, the second, full-dose, image may be acquired about 15-20 minutes after the first injection. Advantageously the amount of contrast agent for the training data can thus be kept low and the comparability of the medical images from the first and second set may be improved, therefore improving the efficiency of the training. Alternatively, these steps may not be necessary, e.g. if corresponding images are already available.

According to a further aspect of one or more example embodiments of the present invention, a computer-implemented method for determining scar segmentation, in particular segmentation of a myocardial scar, is provided. The method comprises the following steps:
 (a) Receiving a medical image of an object to be segmented acquired after an application of a low-dose of contrast agent, wherein the low-dose of contrast agent comprises less contrast agent than a standard full-dose of contrast agent;
 (b) Determining a scar segmentation mask by applying a trained artificial neural network, in particular trained to determine a scar segmentation on an image acquired after an application of a reduced contrast agent dose, such as trained as described herein, to the medical image.

Preferably the ratio of the amount of the low-dose to the amount of the standard full dose may be the same or in the same order of magnitude and/or range as the ratio that was used during training the neural network. Advantageously, this method may allow to use less contrast agent for the purpose of scar segmentation while still achieving a comparable reliability of the scar segmentation. Therein the neural network, in particular if trained as described herein, may be a key algorithm to achieve this. The described method may thus provide a scar segmentation for low-dose medical images, wherein the low-dose is in particular so low that a reliable scar segmentation with a method according to the state of the art would not be possible in a satisfactory and/or reliable way. Furthermore, the automated evaluation via the neural network may provide a more objective, reproducible and timesaving way compared to a more manual evaluation. All features and advantages of the method for training an artificial neural network may be adapted to the computer-implemented method for determining scar segmentation and vice versa.

According to an embodiment, the method comprises the additional step of determining borders of the objects to be segmented, in particular myocardial borders, on the medical image prior to determining the scar segmentation mask, wherein the determination of the scar segmentation by the artificial neural network is restricted to said determined borders. Determining the borders may be carried out before feeding the medical image to the neural network. The borders may be determined in the same way as determining the borders for training the neural network, as described above. Advantageously, the quality and/or reliability may be increased noticeably, when applying this additional step.

According to an embodiment, the contrast agent is a gadolinium-based contrast agent, and the medical image has been in particular acquired via MR imaging with late gadolinium enhancement. According to a further embodiment described in more detail above in relation to the training method, a U-Net based artificial neural network, in particular with Batch Normalization, and/or one or several ReLU activation functions is/are used.

According to a further aspect of one or more example embodiments of the present invention, an imaging method for determining a scar area, in particular of a myocardial scar, of an object is provided. The method comprises the following steps:
 (a) Acquiring a medical image of the object, in particular via magnetic resonance imaging after a low-dose of contrast agent has been applied to the object, wherein the low-dose of contrast agent comprises less contrast agent than a standard full-dose of contrast agent;
 (b) Determining a scar segmentation mask by applying a trained artificial neural network, in particular trained to determine a scar segmentation on an image acquired after an application of a reduced contrast agent dose, such as trained as described herein, to the medical image. The magnetic resonance imaging may comprise an inversion recovery pulse sequence. The imaging may take place 2 to 20 minutes, preferably 3 to 10 minutes after the application of the contrast agent. The imaging may in particular be carried out with late gadolinium enhancement. All features and advantages of the method for training an artificial neural network and the computer-implemented method for determining scar segmentation may be adapted to the imaging method for determining a scar area and vice versa.

According to an embodiment, the trained artificial neural network is trained for scar segmentation, in particular segmentation of a myocardial scar, on contrast agent enhanced medical images with reduced contrast agent dose. The trained artificial neural network may in particular be trained as described herein.

According to an embodiment, the contrast agent is a gadolinium-based contrast agent (GBCA). Advantageously, the medical image may have been acquired via MR imaging with late gadolinium enhancement. The GBCA may be injected about 2 to 20 minutes, preferably 3 to 5 minutes, before imaging. It has turned out that the method may work particularly well, when imaging is carried out 3 to 5 minutes after the administering of the GBCA. The acquired data may for example be reconstructed as magnitude inversion recovery (MagIR) and/or phase-sensitive inversion recovery (PSRI).

According to an embodiment, the low-dose comprises 20% to 90%, preferably 50% to 75%, more preferably 60% to 70% of the amount of contrast agent of the full-dose. The method of one or more example embodiments of the present invention may include the step of applying the low-dose of contrast agent.

According to an embodiment, a U-Net based artificial neural network, in particular with Batch Normalization, and/or one or several ReLU activation functions is/are used. In particular, a U-Net based artificial neural network as described above may be used.

According to an embodiment the imaging method comprises the additional step of determining borders of the objects to be segmented, in particular myocardial borders, on the medical image prior to determining the scar segmentation mask, wherein the determination of the scar segmentation by the artificial neural network is restricted to said determined borders. This additional step may in particular be carried out in between the steps of acquiring the medical image of the object and determining the scar segmentation mask and may be carried out as described above.

According to a further aspect of one or more example embodiments of the present invention a computer program is provided that comprises instructions which, when the program is executed by a processing unit of a medical imaging device, in particular a magnetic resonance imaging device, causes the processing unit to carry out the method or one of the methods as described herein. All features and advantages of the method for training an artificial neural network, the computer-implemented method for determining scar segmentation, and the imaging method for determining a scar area may be adapted to the computer program and vice versa.

According to a further aspect of one or more example embodiments of the present invention, a non-transitory computer-readable medium having stored thereon the computer program as described above is provided. The computer-readable medium may be any digital storage medium, for example a hard disk, a server, a cloud, a computer, an optical or a magnetic digital storage medium, a CD-ROM, an SSD-card, an SD-card, a DVD or a USB or other memory stick. All features and advantages of the method for training an artificial neural network, the computer-implemented method for determining scar segmentation, the imaging method for determining a scar area, and the computer program may be adapted to the non-transitory computer-readable medium and vice versa.

According to a further aspect of one or more example embodiments of the present invention, a system, in particular a magnetic resonance imaging system, for determining a scar area, in particular of a myocardial scar, of an object is provided. The system comprises (a) a first interface configured for receiving a medical image of an object to be segmented acquired after an application of a low-dose of contrast agent, wherein the low-dose of contrast agent comprises less contrast agent than a standard full-dose of contrast agent;

(b) a processing unit configured for determining a scar segmentation mask by applying a trained artificial neural network, in particular trained to determine a scar segmentation on an image acquired after an application of a reduced contrast agent dose, such as trained as described herein, to the medical image;

(c) a second interface, configured for outputting the scar segmentation mask.

The processing unit may be a computer or may be part of a computer. The computer may be a PC, a server, a console of an MRI apparatus. The computer may also be a mobile device, such as a laptop, tablet computer or mobile phone. All features and advantages of the method for training an artificial neural network, the computer-implemented method for determining scar segmentation, the imaging method for determining a scar area, the computer program, and the non-transitory computer-readable medium may be adapted to the system and vice versa.

All embodiments mentioned herein may be combined with each other.

Figure 1:
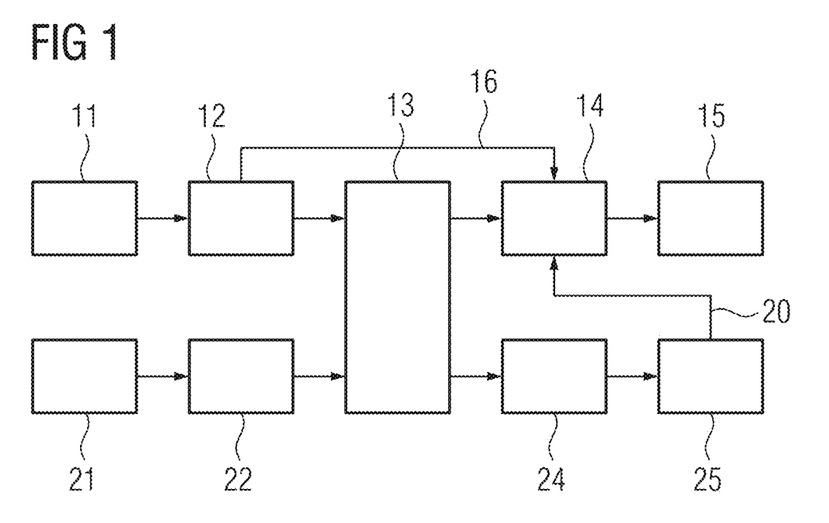
FIG. 1 shows a flow diagram of a method for training an artificial neural network for determining scar segmentation according to one or more example embodiments of the present invention.

FIG. 1 shows a flow diagram of a method for training an artificial neural network for determining scar segmentation according to one or more example embodiments of the present invention. The neural network may preferably be a fully convolutional neural network. The neural network may in particular be trained to segment myocardial scar on images with reduced gadolinium-based contrast agent (GBCA) dose in the way that the scar would be segmented on standard full-dose images using a standard segmentation method, e.g. a FWHM method. In step 11, a first set of medical images 5 is acquired after applying a low-dose of contrast agent. The images from the first set may in particular be low low-dose motion corrected late gadolinium enhanced (LGE) images acquired via magnetic resonance imaging. In step 21, a second set of medical images 6 is acquired after applying a standard full-dose of contrast agent. The images from the second set may in particular be reference full-dose motion corrected LGE images acquired via magnetic resonance imaging. The low-dose of contrast agent comprises less contrast agent than the standard full-dose of contrast agent. After acquisition of each of the first set of images an additional dose of contrast agent may be applied such that the low-dose and the additional dose add up to the full-dose which is then used for acquiring images of the second. For example, the low-dose may comprise 0.1 mmol/kg of contrast agent and the imaging may be timed to take place about 3-5 minutes after the administering of the contrast agent. Further, the additional dose may comprise 0.05 mmol/kg of contrast agent and the imaging of the image from the second set of images may take place about 15-20 minutes in total after administering the low dose, i.e. the first dose. The medical images 5, 6 of the first and second set may be supplemented with simulated images. Oversampling and augmentation may be applied to the real patients' images, in particular such that they occur equally often as the simulated images during training. Augmentation may for example include horizontal and vertical flipping, rotation, translation, scaling, and blurring. Afterwards, borders or contours of the objects to be segmented are provided both on the images from the first set (step 12) and the images from the second set (step 22). Preferably, the images may have the purpose to examine patients with chronic myocardial infarction. Correspondingly, the borders may be myocardial borders. In a further step 13, an image registration of each image from the first set of images together which each corresponding image from the second set of images is performed in order to transform the images into a common coordinate system. In other words, the corresponding images for each patient are transformed into a common coordinate system. The image registration may in particular be based on the borders of the objects to be segmented. In a further step, the first set of images is input into a neural network 14, in particular a convolutional neural network. The neural network predicts a scar segmentation mask 15, while being restricted to the determined borders of the object 16 as determined in step 12. Additionally, in step 24, the scar area of the images from the second set of images is determined with a standard method, such as the FWHM method. Thereby, reference scar segmentation masks are created 25. For the training the reference scar segmentation masks are compared to the scar segmentation masks 15 predicted by the neural network and the weights of the neural network are adjusted accordingly (step 20), i.e. the reference scar segmentation masks 25 serve as ground truth 20 during training of the neural network 14.

Figure 2:
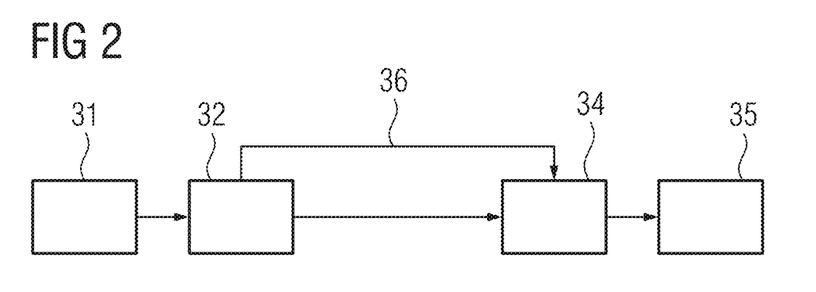
FIG. 2 shows a flow diagram of an imaging method for determining a scar area according to one or more example embodiments of the present invention.

FIG. 2 shows a flow diagram of an imaging method for determining a scar area according to one or more example embodiments of the present invention. The imaging method may in particular have corresponding details as the method for training shown in FIG. 1. In step 31, a medical image 5 is acquired after applying a low-dose of contrast agent. Therein, the low-dose of contrast agent comprises less contrast agent than a standard full-dose of contrast agent. Afterwards, borders or contours 32 of the objects to be segmented are provided on the image. The borders may for example be myocardial borders of a myocardial scar. In a further step, the image is input into a neural network 34, in particular a convolutional neural network. The neural network 34 may in particular be a neural network that is trained as shown in FIG. 1. The neural network predicts a scar segmentation mask 35, while being restricted to the determined borders 32 of the object, as indicated by arrow 36. The output of the imaging method is thus a scar segmentation mask 44, for example a segmentation of myocardial scar, that is based on imaging with a reduced amount of contrast agent but has a similar reliability as a scar segmentation based on a standard full-dose of contrast agent.

Figure 3:
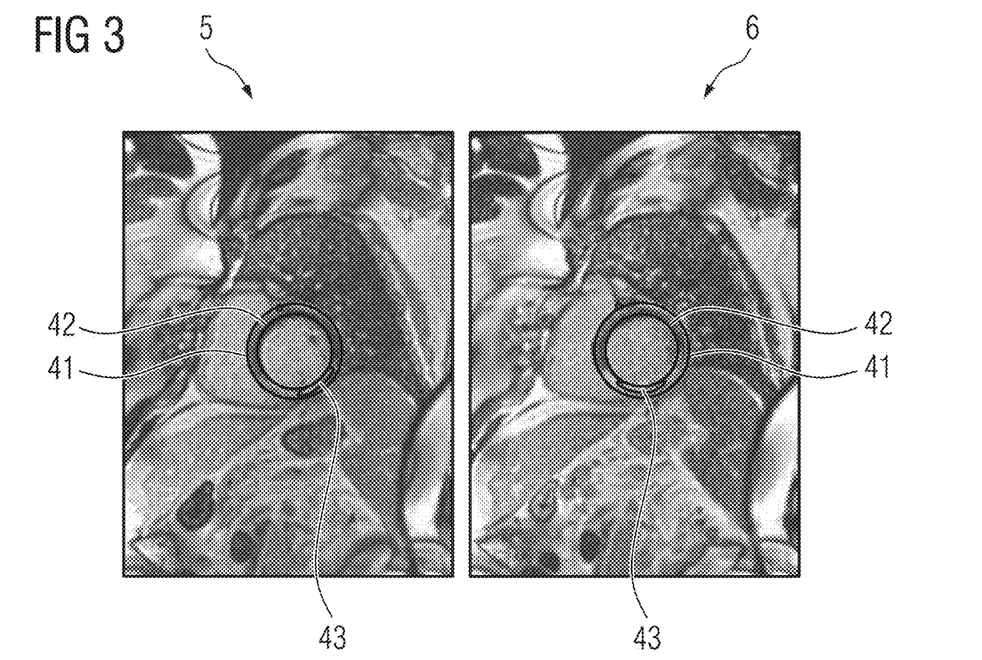
FIG. 3 shows exemplary low-dose (left) and full-dose (right) images with myocardial borders.

FIG. 3 shows an exemplary low-dose image 5 (left) and an exemplary full-dose image 6 (right) where myocardial borders have been drawn. The myocardium is thereby contoured by inner borders 42 and outer borders 41 in each image. Furthermore, a reference area 43 is drawn within the myocardial borders 41, 42. Within the reference area 43, the maximum signal, e.g. per pixel, is taken as reference value for the FWHM method for the full-dose image (right). All pixels within the myocardial borders that have a value higher than half the reference value are considered to be scar tissue and are segmented. The myocardial borders 41, 42 are also used in the neural network to restrict the determination of the scar segmentation to the area within these borders 41, 42. For acquiring a set of low-dose and full-dose images, comprising the exemplary ones shown here, twenty-three patients with chronic myocardial infarction underwent late gadolinium enhanced (LGE) imaging on a MAGNETOM AvantoFit 1.5T scanner. A low-dose motion corrected (MOCO) LGE image in short axis position was acquired after application of a first bolus of gadolinium-based contrast agent (GBCA) (0.1 mmol/kg Gadoteridol, imaged ~3-5 minutes post-injection). A reference full-dose MOCO LGE image was obtained after additional injection of GBCA (0.05 mmol/kg Gadoteridol injected immediately after low-dose LGE, imaged ~15-20 minutes after first injection). Each acquisition was reconstructed as magnitude inversion recovery (MagIR) and phase-sensitive inversion recovery (PSIR). The results based on both recovery methods were mostly equivalent. The myocardial borders were contoured in the low- and full-dose images by a reader with three years of experience (consensus read with an ESC/EACVI CMR Level III certified reader in case of inconclusive findings).

The data set was supplemented with simulated images using an MR physics simulator and a virtual phantom, namely the XCAT virtual phantom as described by Segars et al. in "4D XCAT phantom for multimodality imaging research", Medical Physics, 2010; 37:4902-4915, doi: 10.1118/1.3480985. Oversampling and augmentation were applied to real patients' images such that they occurred equally often as simulated images during training. Augmentation included horizontal and vertical flipping, rotation, translation, scaling, and blurring. Image registration was performed based on the contours as described above. Images were cropped to 128×128 pixels around the center of the left ventricle. A 2-D U-Net with Batch Normalization, ReLU activation functions, and the Dice loss function was trained to segment the scarred area on the low-dose images. The U-Net contained four levels, i.e. three pooling operations, and was optimized using the Adam optimizer and a learning rate of 10-4. After inference, the network output was restricted to lie within the previously contoured myocardium. Of the 23 patients, ten were used for training the network (in addition to 340 simulated images), five for validation, and eight for testing. A dice score of unseen test data for individual images reached values up to 0.777. Predicted and ground-truth scar sizes, where correlated with a Pearson's r of 0.87. The trained neural network was able to locate and estimate the size of myocardial scars.

Figure 4:
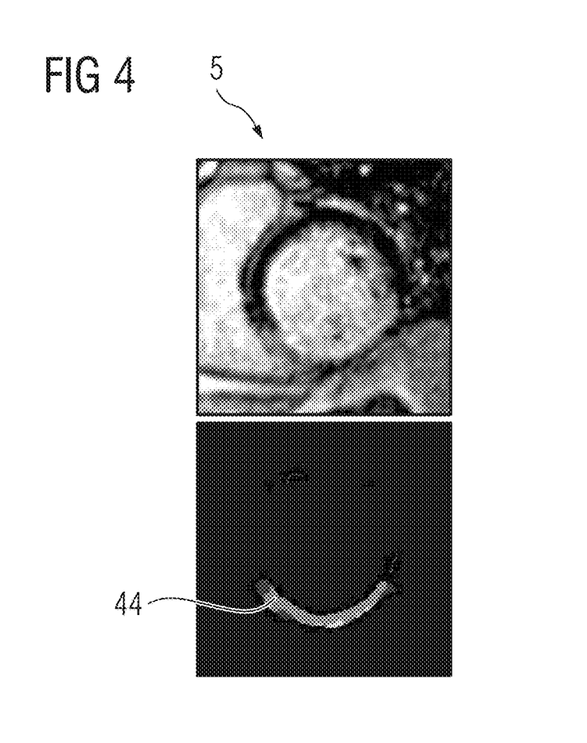
FIG. 4 shows an exemplary low-dose LGE image (top) with a corresponding scar segmentation mask (bottom)

FIG. 4 shows an exemplary low-dose LGE image 5 (top) with a corresponding scar segmentation mask 44 (bottom) from a test data set.

Figure 5:
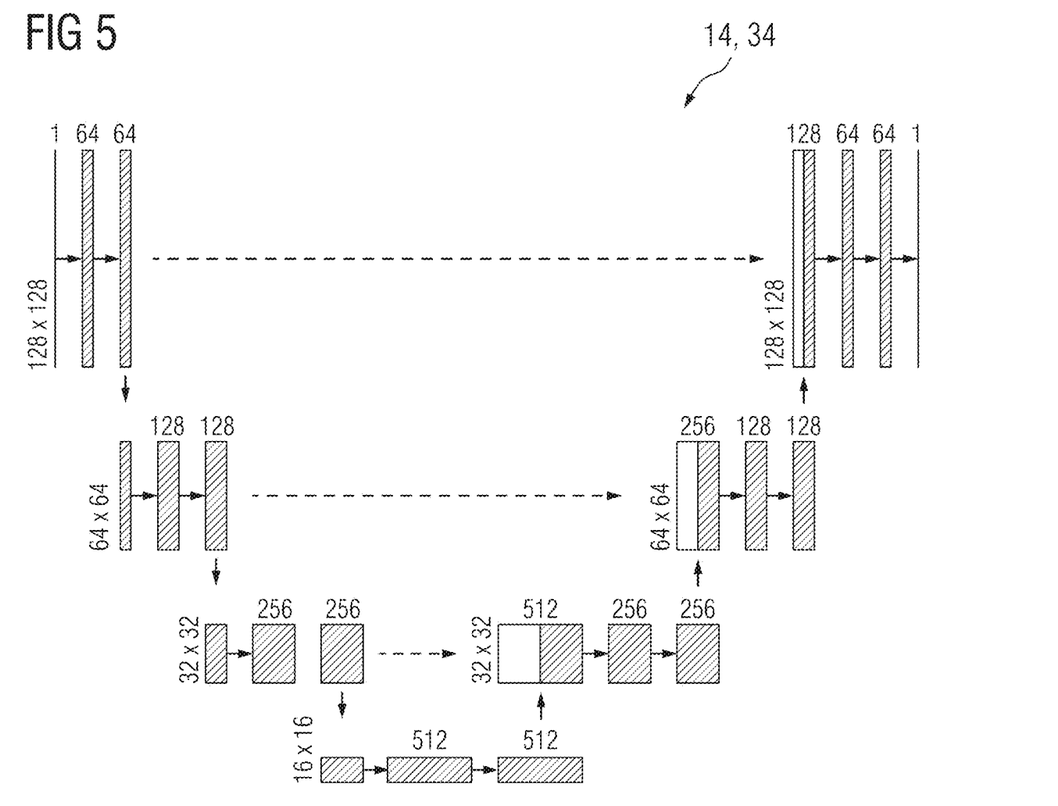
FIG. 5 shows a U-Net based neural network architecture according to one or more example embodiments of the present invention.

FIG. 5 shows a U-Net based neural network architecture according to one or more example embodiments of the present invention. The numbers above the layers indicate the depths of the layers. Arrows pointing downwards denote max pooling, arrows pointing upwards denote an upsampling followed by a convolution, and arrows pointing to the right denote a convolution, Batch Normalization and a rectified linear unit (ReLU). The dashed arrows denote copying, wherein states are to be copied from earlier layers to later layers and then concatenated thereby skipping layers in between. Thereby, the empty boxes denote copied states.

Figure 6:
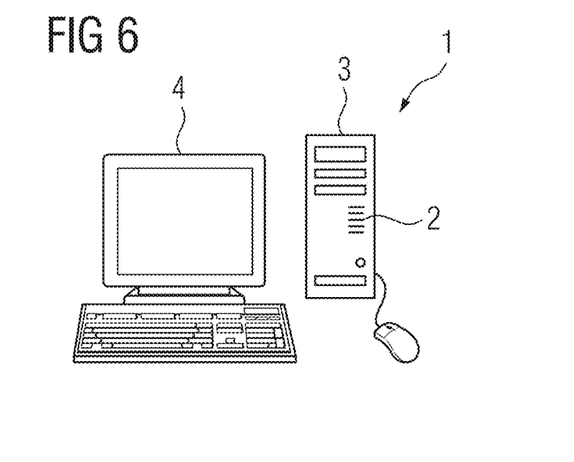
FIG. 6 shows a system for determining a scar area according to one or more example embodiments of the present invention.

FIG. 6 shows a system 1 for determining a scar area according to one or more example embodiments of the present invention. The system 1 comprises a first interface 2 configured for receiving a medical image 5 of an object to be segmented acquired after an application of a low-dose of contrast agent. The system 1 further comprises a processing unit 3 configured for determining a scar segmentation mask by applying a trained artificial neural network and a second interface 4, configured for outputting the scar segmentation mask 44. In this example the second interface 4 is a screen, however the second interface 4 may also be a data interface configured to transfer the scar segmentation mask 44 as data.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein and mentioned above, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units (e.g., processing unit) and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module', 'interface' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A method for training an artificial neural network for determining scar segmentation on contrast agent enhanced medical images with a reduced contrast agent dose, the method comprising:
acquiring a first set of medical images after a low-dose of a contrast agent has been applied;
receiving input training data, the input training data including the first set of medical images of objects to be segmented acquired after the application of the low-dose of the contrast agent, the low-dose of the contrast agent including less of the contrast agent than a full-dose of the contrast agent;

acquiring a second set of medical images after an additional dose of the contrast agent has been applied such that the low-dose and the additional dose equal the full-dose;

receiving output training data, the output training data including reference scar segmentation masks determined from the second set of medical images of the objects acquired after the application of the full-dose of the contrast agent; and training the artificial neural network using the input training data and the output training data to determine the scar segmentation on the contrast agent enhanced medical images with the reduced contrast agent dose.

2. The method of claim 1, further comprising:
determining the reference scar segmentation masks via a full width at half maximum method on the second set of medical images.

3. A non-transitory computer-readable medium including instructions which, when executed by a processing unit of a medical imaging device, cause the medical imaging device to perform the method of claim 2.

4. The method of claim 1, wherein
at least one of the input training data or the output training data comprise real medical images and simulated medical images.

5. The method of claim 4, wherein a number of the real medical images is increased by at least one of oversampling or augmentation.

6. The method of claim 5, further comprising:
performing an image registration of the first set of medical images and the second set of medical images to transform the first set of medical images and the second set of medical images into a common coordinate system.

7. The method of claim 1, further comprising:
performing an image registration of the first set of medical images and the second set of medical images to transform the first set of medical images and the second set of medical images into a common coordinate system.

8. An imaging method for determining a scar area of an object, the method comprising:
acquiring a medical image of the object after a low-dose of a contrast agent has been applied to the object, the low-dose of contrast agent includes less of the contrast agent than a full-dose of the contrast agent; and
determining a scar segmentation mask by applying a trained artificial neural network to the medical image, the trained artificial neural network being trained according to the method of claim 1.

9. A non-transitory computer-readable medium including instructions which, when executed by a processing unit of a medical imaging device, cause the medical imaging device to perform the method of claim 1.

10. The method of claim 1, wherein the scar segmentation is a segmentation of a myocardial scar.

11. A computer-implemented method for determining scar segmentation, the method comprising:
receiving a medical image of an object to be segmented acquired after an application of a low-dose of a contrast agent, the low-dose of the contrast agent including less of the contrast agent than a full-dose of the contrast agent;

determining borders of the object to be segmented on the medical image; and determining a scar segmentation mask by applying a trained artificial neural network to the medical image after the determining the borders of the object to be segmented on the medical image, the determining the scar segmentation by the trained artificial neural network being restricted to the borders.

12. The method of claim 11, wherein the trained artificial neural network is trained for scar segmentation on contrast agent enhanced medical images with a reduced contrast agent dose.

13. The method of claim 11, wherein
the contrast agent is a gadolinium-based contrast agent, and
the medical image is acquired via MR imaging with late gadolinium enhancement.

14. The method of claim 11, wherein the low-dose comprises 20% to 90% of an amount of the contrast agent of the full-dose.

15. The method of claim 11, wherein a U-Net based artificial neural network is used.

16. A system for determining a scar area of an object, the system comprising:
a first interface configured to receive a medical image of the object to be segmented acquired after an application of a low-dose of a contrast agent, the low-dose of the contrast agent including less of the contrast agent than a full-dose of the contrast agent;

a processing unit configured to determine a scar segmentation mask by applying a trained artificial neural network, the trained artificial neural network being trained by
receiving input training data, the input training data including a first set of medical images of objects to be segmented acquired after an application of the low-dose of the contrast agent,
receiving output training data, the output training data including reference scar segmentation masks determined from a second set of medical images of the objects acquired after an application of the full-dose of the contrast agent, and
training an artificial neural network using the input training data and the output training data to obtain the trained artificial neural network to determine scar segmentation on contrast agent enhanced medical images with a reduced contrast agent dose; and a second interface configured to output the scar segmentation mask.

17. A computer-implemented method for determining scar segmentation, the method comprising:
receiving a medical image of an object to be segmented acquired after an application of a low-dose of a contrast agent, the low-dose of the contrast agent including less of the contrast agent than a full-dose of the contrast agent; and determining a scar segmentation mask by applying a trained artificial neural network to the medical image, wherein the low-dose of the contrast agent comprises 50% to 75% of an amount of the contrast agent of the full-dose.

18. The method of claim 17, wherein the low-dose comprises 60% to 70% of the amount of the contrast agent of the full-dose.

* * * * *